United States Patent
Onoda et al.

(10) Patent No.: US 9,321,164 B2
(45) Date of Patent: Apr. 26, 2016

(54) IMPACT TOOL

(75) Inventors: Shinji Onoda, Anjo (JP); Hitoshi Iida, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 751 days.

(21) Appl. No.: 13/531,910

(22) Filed: Jun. 25, 2012

(65) Prior Publication Data

US 2013/0000936 A1 Jan. 3, 2013

(30) Foreign Application Priority Data

Jul. 1, 2011 (JP) ................................. 2011-147762

(51) Int. Cl.
| | |
|---|---|
| *H02K 7/14* | (2006.01) |
| *H02K 9/06* | (2006.01) |
| *B25F 5/02* | (2006.01) |
| *B25D 16/00* | (2006.01) |
| *B25F 5/00* | (2006.01) |
| *H02K 11/00* | (2006.01) |

(52) U.S. Cl.
CPC ............... *B25D 16/00* (2013.01); *B25F 5/008* (2013.01); *H02K 9/06* (2013.01); *H02K 11/0073* (2013.01); *B25D 2217/0061* (2013.01); *H02K 7/145* (2013.01)

(58) Field of Classification Search
CPC ... B25F 5/008; B25F 5/02; B25D 2217/0061; B25D 16/00; H02K 9/06; H02K 11/0073
See application file for complete search history.

(56) References Cited

U.S. PATENT DOCUMENTS

| | | | | |
|---|---|---|---|---|
| 5,099,160 | A * | 3/1992 | Strozel et al. .................... | 310/56 |
| 6,123,158 | A * | 9/2000 | Steffen ........................ | 173/217 |
| 6,543,549 | B1 * | 4/2003 | Riedl et al. .................... | 173/216 |
| 7,705,497 | B2 * | 4/2010 | Arich et al. .................... | 310/62 |
| 7,768,750 | B2 * | 8/2010 | Uchida .......................... | 361/31 |
| 8,084,901 | B2 * | 12/2011 | Oomori et al. .................. | 310/50 |
| 8,333,252 | B2 * | 12/2012 | Britz et al. .................... | 173/217 |
| 8,443,914 | B2 * | 5/2013 | Bito et al. ..................... | 173/198 |
| 8,513,838 | B2 * | 8/2013 | Toukairin et al. ............... | 310/50 |
| 8,816,544 | B2 * | 8/2014 | Tanimoto et al. ................ | 310/50 |
| 2006/0137888 | A1 | 6/2006 | Soika et al. | |
| 2007/0221392 | A1 * | 9/2007 | Britz et al. .................... | 173/213 |

(Continued)

FOREIGN PATENT DOCUMENTS

| | | |
|---|---|---|
| EP | 2 103 396 A1 | 9/2009 |
| EP | 2 251 148 A1 | 11/2010 |

(Continued)

OTHER PUBLICATIONS

Extended European Search Report issued in European Application No. 12173856.1 dated Sep. 27, 2012.

(Continued)

*Primary Examiner* — Andrew M Tecco
(74) *Attorney, Agent, or Firm* — Oliff PLC

(57) ABSTRACT

An impact comprising: a motor (20) defined as a brushless DC motor; a battery (130); a cooling fan (90); a driving current providing device (70) which provides current from the battery (130) to the motor (20); and a controller (60) which controls the driving current providing device (70). The motor (20), the controller (60) and the driving current providing device (70) are arranged adjacently to each other and are cooled by the cooling air generated by the cooling fan (90).

12 Claims, 4 Drawing Sheets

(56) References Cited

U.S. PATENT DOCUMENTS

| | | | |
|---|---|---|---|
| 2009/0229957 A1* | 9/2009 | Nishimiya | B25F 5/008 200/292 |
| 2010/0244592 A1* | 9/2010 | Oomori et al. | 310/50 |
| 2010/0253162 A1* | 10/2010 | Sakamaki et al. | 310/50 |
| 2010/0283332 A1* | 11/2010 | Toukairin et al. | 310/50 |
| 2011/0024146 A1 | 2/2011 | Katou et al. | |
| 2011/0171887 A1 | 7/2011 | Tanimoto et al. | |

FOREIGN PATENT DOCUMENTS

| | | |
|---|---|---|
| JP | 2006175592 A | 7/2006 |
| JP | 2007136607 A * | 6/2007 |
| JP | A-2008-302443 | 12/2008 |
| JP | 2009-214260 A | 9/2009 |
| JP | 2010173042 A | 8/2010 |
| WO | WO 2009/145205 A1 | 12/2009 |
| WO | WO 2010087235 A1 * | 8/2010 |

OTHER PUBLICATIONS

Nov. 10, 2014 Office Action issued in Japanese Application No. 2011147762.

Mar. 24, 2015 Office Action issued in Japanese Application No. 2011-147762.

* cited by examiner

IMPACT TOOL

CROSS REFERENCE TO RELATED APPLICATION

The present application claims priority from Japanese Patent Application No. 2011-147762, filed on Jul. 1, 2011, the disclosure of which is incorporated herein by reference in its entirety.

FIELD OF THE INVENTION

The invention relates to an impact tool for performing a hammering operation to a workpiece.

BACKGROUND OF THE INVENTION

Japanese non-examined Patent Application Publication No. 2008-302443 discloses an impact tool having a brushless DC motor which actuates a tool, and a control means which controls a brushless DC motor. The control means is provided with a semiconductor such as a micro-processor. Because the control means generates heat when the impact tool is working, to dissipate heat generated on the micro-processor is necessary.

SUMMARY OF THE INVENTION

Problem to be Solved by the Invention

An object of the invention is, in consideration of the above described problem, to provide a technique to effectively dissipate heat generated inside an impact tool.

Means for Solving the Problem

Above-mentioned object is achieved by the claimed invention. According to a preferable aspect of the invention, an impact tool comprising: a brushless DC motor; a battery; a current providing device which provides current from the battery to the brushless DC motor; a controller which controls the current providing device; and a cooling fan. The brushless DC motor, the current providing device and the controller are adapted to be arranged adjacently to each other and cooled by a cooling air generated by the cooling fan. Further, the current providing device is also called as "a current supplier" or "a current supplying device".

The lifetime of a brushless DC motor is longer than a brush motor generally, because the brushless DC motor does not have a brush being in fraction. On the other hand, a current providing device which provides current from a battery to the brushless DC motor and a controller which controls the current providing device are necessary for actuating the brushless DC motor. A current flow in the brushless DC motor, the current providing device and the controller generates heat because of a power loss. Therefore the generated heat is necessary to be dissipated. According to this aspect, because the brushless DC motor, the current providing device and the controller are arranged adjacently to each other and cooled by a cooling air generated by a cooling fan, the heat is effectively dissipated. Further, because the brushless DC motor, the current providing device and the controller are arranged adjacently to each other, the wiring to connect to these components is shortened.

According to a further preferable aspect of the invention, the cooling fan is attached to the rotational shaft of the brushless DC motor. When seen in the axial direction of the rotational shaft, at least one component of the current providing device and the controller is arranged to be overlapped with the brushless DC motor. "To be overlapped with the brushless DC motor" of the invention means that when seen in the axial direction of the rotational shaft a region of the brushless DC motor and a region of the current providing device and the controller are overlapped with each other. Namely, an area of the brushless DC motor on the project plane and an area of the current providing device and the controller on the project plane are overlapped with each other, when projected from the axial direction of the rotational shaft. Further in this case, a feature that an outline of the brushless DC motor and an outline of the current providing device and the controller are circumscribed is preferably included.

According to this aspect, the current providing device and the controller are arranged in a route of the cooling air. Therefore the heat generated by the current providing device and the controller is effectively dissipated. Further, when seen in the axis line of the rotational shaft, at least one component among the current providing device and the controller is arranged to be overlapped with the motor, thereby an arrangement of components in the impact tool is rationalized. Accordingly the impact tool is downsized. "At least one component among the current providing device and the controller is arranged to be overlapped with the brushless DC motor when seen in an axial direction of the rotational shaft" of the invention preferably includes features that when seen in the axial direction of the rotational shaft (1) one component among the current providing device and the controller is partially overlapped with the brushless DC motor, (2) one component among the current providing device and the controller is wholly overlapped with the brushless DC motor, (3) the current providing device and the controller are partially overlapped with the brushless DC motor respectively, (4) the current providing device and the controller are wholly overlapped with the brushless DC motor respectively, and (5) one component among the current providing device and the controller is partially overlapped with the brushless DC motor and the other component is wholly overlapped with the brushless DC motor. Further, a feature that the current providing device and the controller are arranged on the axis line of the rotational shaft is preferable. According this feature, the impact tool is more effectively downsized.

According to a further preferable aspect of the invention, the current providing device and the controller are arranged at an upper stream region than the brushless DC motor with respect to the flow of the cooling air. As to an impact tool utilizing a motor, the motor is driven by a large current to make a large power for performing the operation to a workpiece. Especially, as to the impact tool utilizing a brushless DC motor, a large current is provided to the current providing device and the controller thereby an amount of heat generation of the current providing device and the controller is larger than one of the brushless DC motor. Further, cooling down the current providing device and the controller effectively is necessary to dissipate heat generated in a housing having a narrow inner space. Therefore the current providing device and the controller which generate relatively a large amount of heat are arranged at upstream than the brushless DC motor with respect to the flow of the cooling air. As a result, the current providing device and the controller are cooled by a fresh air which is relatively low temperature. Namely, the feature described above is helpful and useful especially in the impact tool.

According to a further preferable aspect of the invention, the impact tool further comprises a housing which houses the brushless DC motor, the current providing device and the controller. An air inlet is arranged between the brushless DC motor and the current providing device as well as the controller. According to this aspect, because the air inlet is arranged between the brushless DC motor and the current providing device as well as the controller, a heat generated by adjacently arranged components which is provided with the brushless DC motor, the current providing device and the controller is dissipated by an air flowed into the housing through the air inlet.

According to a further preferable aspect of the invention, at least one component among the current providing device and the controller has a radiation member. The radiation member includes a heat radiating surface having a predetermined area and the radiation member is arranged such that the heat radiating surface extends along the flow of the cooling air. According to this aspect, because the heat radiating surface is adapted to extend along the flow of the cooling air, the cooling air flows smoothly along the heat radiation surface without being stagnated. Therefore the heat transmitted to the radiation member is effectively dissipated, further the heat generated by said at least one component having the radiation member is effectively dissipated. "At least one component among the current providing device and the controller" preferably includes features that correspond to only the current providing device, only the controller, and both of the current providing device and the controller. Further, in the feature corresponding to the both of the current providing device and the controller, only one radiation member may be arranged, which contacts with both of the current providing device and the controller.

According to a further preferable aspect of the invention, the rotational shaft of the brushless DC motor is adapted and arranged to cross the longitudinal direction of the tool. According to this aspect, in the impact tool including a feature that the rotational shaft of the brushless DC motor crosses the longitudinal direction of the tool, the heat generated by the current providing device and the controller is effectively dissipated.

According to a further preferable aspect of the invention, the impact tool further comprises a driving mechanism which actuates the tool by transmitting the rotation of the rotational shaft of the brushless DC motor to the tool. The driving mechanism is arranged at one side of the axis line of the rotational shaft with respect to the brushless DC motor, and the current providing device and the controller are arranged at the other side of the axis line of the rotational shaft with respect to the brushless DC motor. According to this aspect, the driving mechanism, the brushless DC motor, the current providing device and the controller are rationally arranged in order therefore the impact tool is downsized.

According to a further preferable aspect of the invention, the impact tool further comprises a grip which is held by a user. A predetermined part of the grip is arranged on a longitudinal line of the tool. According to this aspect, because the predetermined part of the grip is arranged on the longitudinal line of the tool, a power to which a user applies on the predetermined part of the grip is regulated to be converted into the moment. Accordingly, the power applied by a user is effectively transmitted to the tool.

According to a further preferable aspect of the invention, the grip is provided to extend in a direction crossing the longitudinal direction of the tool. The battery is provided to connect to one end of the grip with respect to the direction crossing the longitudinal direction of the tool. According to this aspect, the battery is arranged other than on the longitudinal line of the tool thereby a length between the grip and the tool. Namely the impact tool is downsized with respect to the longitudinal direction of the tool.

According to the invention, a heat generated in an impact tool is effectively dissipated.

Other objects, features and advantages of the invention will be readily understood after reading the following detailed description together with the accompanying drawings and the claims.

DESCRIPTION OF THE PREFERRED EMBODIMENTS

Each of the additional features and method steps disclosed above and below may be utilized separately or in conjunction with other features and method steps to provide and manufacture improved impact tools and method for using such the impact tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
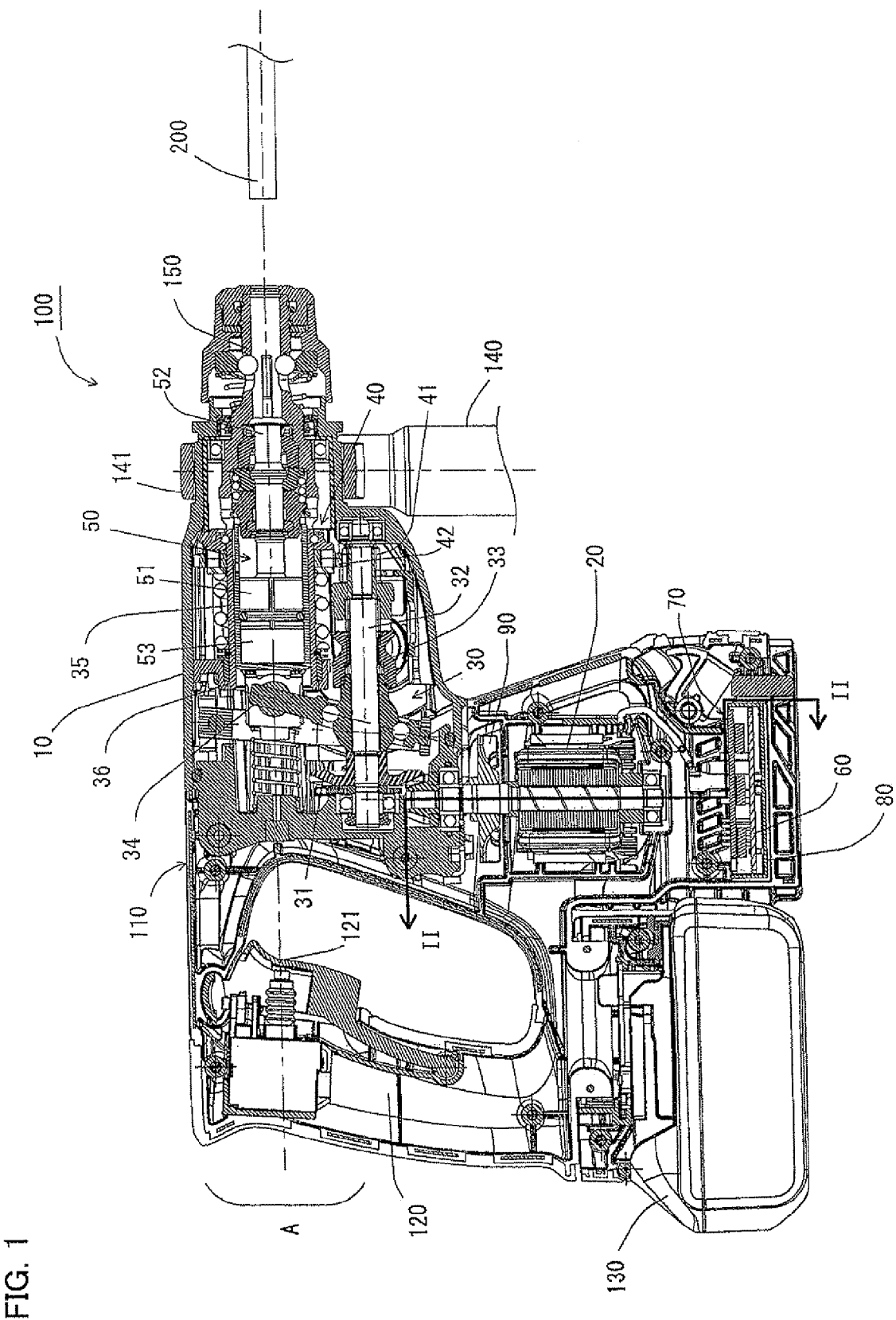
FIG. 1 shows a partial cross-sectional view of a total composition of a hammer drill in accordance with an embodiment of the invention.
Figure 2:
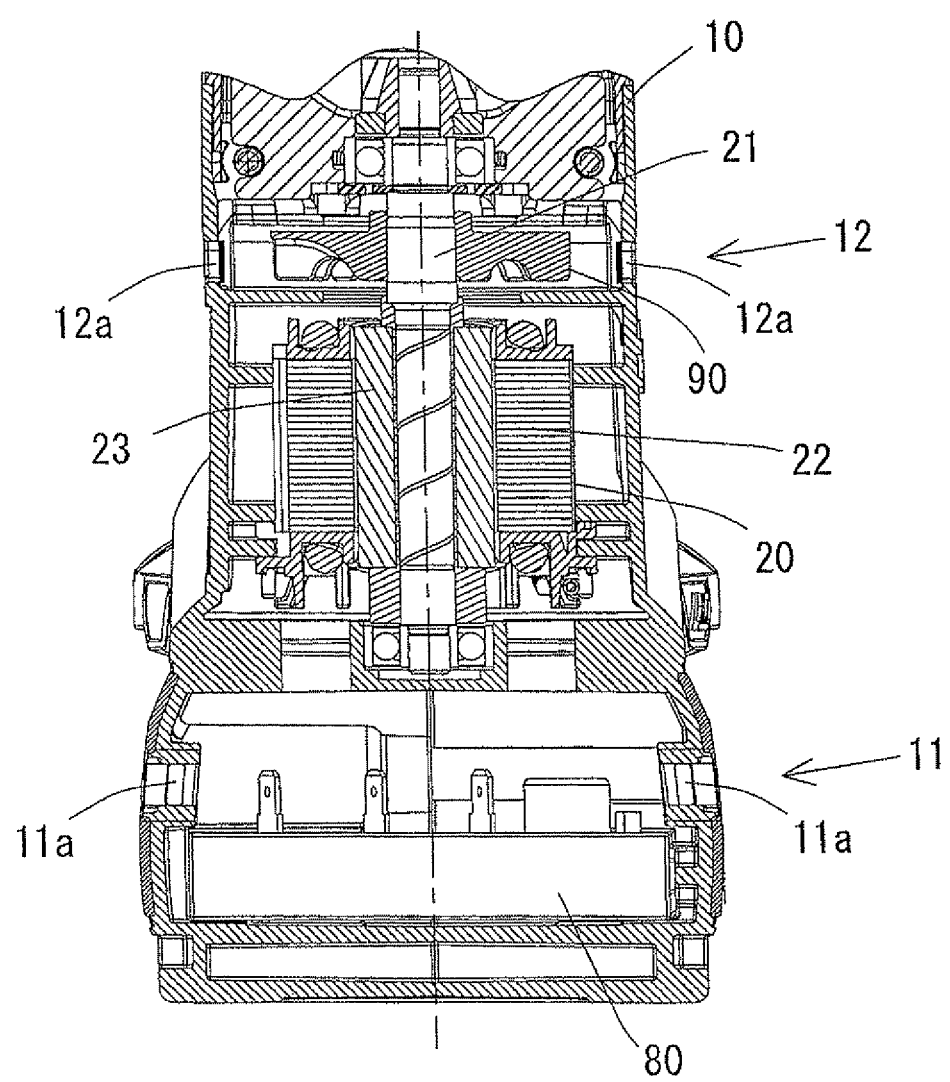
FIG. 2 shows a cross-sectional view taken from line II-II of FIG. 1.

An embodiment of the invention will be explained with reference to FIG. 1 to FIG. 4. In this embodiment, the invention will be explained by applying to a hammer drill as one example of an impact tool, which actuates a hammer bit in a longitudinal direction of the hammer bit to perform a hammer operation to a workpiece by the hammer bit. As shown in FIG. 1, the hammer drill 100 is mainly provided with a body 110, a grip 120, a battery 130 a handle 140 and a tool holder 150. Hereinafter a right side of FIG. 1 is called a front side of the hammer drill 100 and a left side of FIG. 1 is called a rear side of the hammer drill 100. A lateral direction of FIG. 1 is defined as a front-rear direction of the hammer drill 100. A vertical direction of FIG. 1 and FIG. 2 is defined as a vertical direction of the hammer drill 100. A lateral direction of FIG. 2 is defined as a lateral direction of the hammer drill 100. The hammer bit 200 is a feature corresponding to "a tool" of the invention.

The body 110 is mainly provided with a housing 10 as an outline of the hammer drill 100. The housing 10 is provided with a pair of approximately symmetrical housings which are connected to each other. The housing 10 houses a motor 20, a motion converting mechanism 30, a power transmission mechanism 40 and an impact element 50 therein.

The grip 120 is arranged at the rear side of the hammer drill 100 and the grip 120 extends in the vertical direction which crosses a longitudinal direction of the hammer bit 200. A partial part A of the grip 120 is arranged on a longitudinal line of the hammer bit 200. The partial part A is a feature corresponding to a predetermined part of a grip of the invention. A trigger 121 is arranged on the grip 120. The motor 20 is driven when a user pulls the trigger 121. The trigger 121 is arranged on the longitudinal line of the hammer bit 200 which is corresponding to the partial part A. The battery 130 is attachably arranged at one end of the grip 120 which corresponds to a lower part of the hammer drill 100.

The handle 140 is attachably arranged at the front side of the hammer drill 100. The handle 140 is mainly provided with an attachment ring 141 and a bolt. The attachment ring 141 is attached at an outside of the housing 10 by engaging a periphery of the housing 10. The bolt is adapted to fasten the ring 141 on the housing 10. In FIG. 1, a longitudinal direction of the handle 140 corresponds with the vertical direction of the hammer drill 100, however the longitudinal direction is adapted to turn in any direction by rotating the attachment ring 141 around the housing 10.

The tool holder 150 is arranged at a front end of the body 110. The hammer bit 200 is attachably held by the tool holder 150 thereby the tool holder 150 transmits the rotational power of the motor 20 to the hammer bit 200.

The motor 20 is arranged in the housing 10 so that a rotational shaft 21 of the motor 20 is extended in the vertical direction of the hammer drill 100. In this embodiment, a brushless DC motor is utilized as the motor 20. The motion converting mechanism 30, the power transmission mechanism 40 and the impact element 50 are arranged at an upper area of the rotational shaft 21 of the motor 20. A component provided with the motion converting mechanism 30, the power transmission mechanism 40 and the impact element 50 is a feature corresponding to "a driving mechanism" of the invention.

The motion converting mechanism 30 is adapted to convert the rotational shaft 21 to a linear motion along the front-rear direction of the hammer drill 100 and is arranged at the upper area of the rotational shaft 21 of the motor 20. The motion converting mechanism 30 is mainly provided with a bevel bear 31, an intermediate shaft 32, a rotational member 33, a swing member 34, a piston 35 and a cylinder 36. The bevel gear 31 transmits the rotational power of the rotational shaft 21 to the intermediate shaft 32 thereby the intermediate shaft 32 is driven by the bevel gear 31. The rotational member 33 is attached on the intermediate shaft 32. The swing member 34 is swung in the front-rear direction of the hammer drill 100 incorporate with a rotational motion of the intermediate shaft 32. The piston 35 is reciprocally moved in the front-rear direction of the hammer drill 100 incorporated with a swinging motion of the swing member 34. The cylinder 36 houses the piston 35.

The power transmission mechanism 40 is adapted to transmit the rotational power of the motor 20, transmitted to the intermediate shaft 32 of the motion converting mechanism 30, to the tool holder 150. The power transmission mechanism 40 is arranged at a front side of the motion converting mechanism 30. The power transmission mechanism 40 is provided with a gear mechanism comprising a plurality of gears such as a first gear 41, a second gear 42 and so on. The first gear 41 is rotated integrally with the intermediate shaft 32. The second gear 42 is mated with the first gear 41 and rotated with the first gear 41.

The impact element 50 is arranged an upper area of the motion converting mechanism 30 and a rear area of the tool holder 150. The impact element 50 is adapted to transmit a power in the front-rear direction of the hammer drill 100, which is converted by the motion converting mechanism 30 from the rotational power of the motor 20, to the hammer bit 200 as an impact power. The impact element 50 is mainly provided with a striker 51 and an impact bolt 52. The striker 51 is slidably arranged in the piston 35 as an impact member. The impact bolt 52 is arranged at front of the striker 51 so that the striker 51 impacts the impact bolt 52. Further, an air room 53 is formed in the cylinder between the striker 51 and the piston 35 thereby pressure of the air room 53 is fluctuated by a sliding motion of the piston 35. The striker 51 is slid by the pressure fluctuation of the air room 53.

Figure 4:
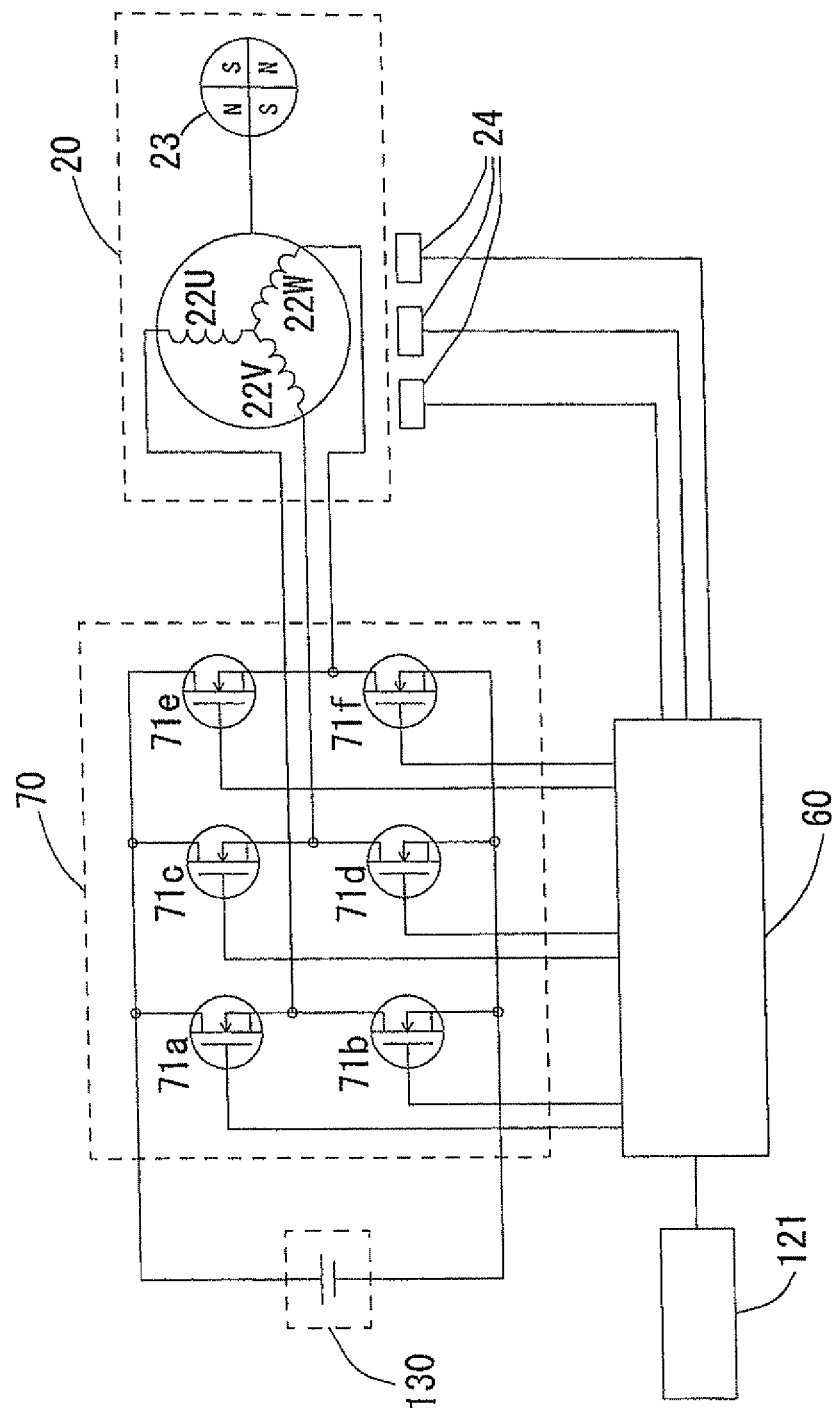
FIG. 4 shows a block diagram of a driving control mechanism of the invention.

As shown in FIG. 2, the brushless DC motor utilized as the motor 20 in this embodiment. The motor 20 is mainly provided with the rotational shaft 21, a stator 22 and a rotor 23. The stator 22 is formed as a cylinder. The rotor 23 is arranged in the stator 22 to be aligned with the stator 22. As shown in FIG. 4, the stator 22 includes stator coils 22U, 22V, 22W comprising three-phase winding wire. The rotor 23 includes a magnet extending in the longitudinal direction therein.

As shown in FIG. 1 and FIG. 2, a driving current providing device 70 and a controller 60 are arranged in a container. The driving current providing device 70 provides current to the motor 20 from the battery 130. The container 80 is arranged at a lower area of the motor 20 to be overlapped with the motor 20 when seen in the longitudinal direction of the rotational shaft 21. The container 80 is arranged adjacently to the motor 20.

Figure 3:
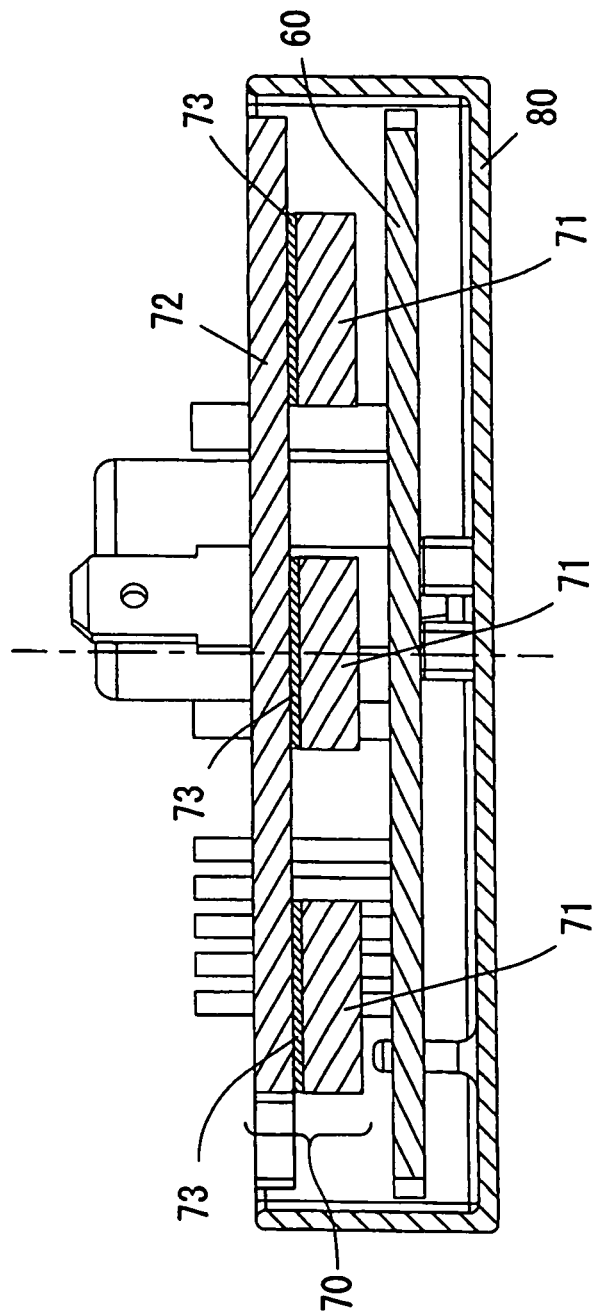
FIG. 3 shows a cross-sectional view of a controller and a driving current providing device of the invention.

The controller 60, the driving current providing device 70 and the container 80 will be explained with reference to FIG. 3. The container 80 is formed as approximately box-shaped member which has an upward opening thereon. The container 80 contains the controller 60 and the driving current providing device 70 therein.

The controller 60 is provided with a printed circuit board, a CPU (Central Processing Unit) arranged on the printed circuit board, a ROM (Read Only Memory) and a RAM (Random Access Memory). The ROM stores programs and/or data to detect position of the rotor 23 based on a signal from a position detection element 24 and/or to control the driving current providing device 70. The RAM is adapted to store temporary data which is processed by the CPU. Only the printed circuit board is shown in FIG. 1 and FIG. 3 among the controller 60, namely the CPU, the ROM and the RAM is not shown for convenience.

The driving current providing device 70 is mainly provided with 6 switching elements 71 and a radiation plate 72. The radiation plate 72 is at an upper side of the switching elements 71 via a heat transfer material 73 such as silicon grease like that. FET (Field Effect Transistor) and/or IBT (Insulated-gate Bipolar Transistor) and so on is utilized as the switching elements 71. The radiation plate 72 is made of higher heat conductivity material such as copper ally, aluminum like that and the radiation plate 72 is formed as a plate member. The driving current providing device 70 comprising the switching elements 71, the radiation plate 72 and the heat transfer material 73 is a feature corresponding to "a driving current providing device" of the invention. The radiation plate 72 is a feature corresponding to "a radiation member" of the invention. However, the driving current providing device 70 may not comprise the radiation plate 72. In a case that the driving current providing device 70 comprises the radiation plate 72, the radiation plate 72 may arranged directly on the switching elements 71 without the heat transfer material 73. Namely, the driving current providing device 70 comprises at least the switching elements 71.

The controller 60 and the driving current providing device are arranged adjacently to each other inside the container 80. As shown in FIG. 1, the radiation plate 72 is arranged so as to extend in the front-rear direction of the hammer drill 100 and to cross the housing 10. As shown in FIG. 3, the upper surface of the radiation plate 72 is arranged at approximately same level with the upward opening of the container 80. The upper surface of the radiation plate 72 is a feature corresponding to "a heat radiating surface" of the invention. This embodiment corresponds to only the current providing device has the radiation member having the heat radiating surface of the invention. The controller 60 and the driving current providing device 70 are arranged on the axis line of the rotational shaft 21 when seen in the longitudinal direction of the rotational shaft 21 of the motor 20.

As described above, the controller 60 and the driving current providing device 70 are arranged adjacently to each other inside the container 80, further the container 80 is arranged adjacently to the motor 20. Therefore the motor 20, the controller 60 and the driving current providing device 70 are arranged adjacently to each other. This embodiment corresponds to the component that both of the controller and the current providing device are arranged and overlapped with the brushless DC motor when seen in a longitudinal direction of the rotational shaft of the invention.

A driving control mechanism of the hammer drill 100 will be explained with reference to block diagram of FIG. 4. The driving control mechanism is mainly provided with 3 position detection elements 24, the driving current providing device 70 and the controller 60. The position detection elements 24 are arranged at each 120 degrees around the motor 20 which is to detect a position of the rotor 23 of the motor 20. The driving current providing device 70 is adapted to provide current to the stator coils 22U, 22V, 22W from the battery 130. The driving current providing device 70 includes 6 switching elements 71a to 71f and these 6 switching elements 71a to 71f are controlled by the controller 60 thereby the each switching elements 71a to 71f provide current to a predetermined stator coils 22U, 22V, 22W. The controller 60 detects the position of the rotor 23 based on a detection signal of the position detection elements 24. The controller 60 controls the driving current providing device 70 by outputting a driving signal to the driving current providing device 70.

The controller 60 provides current selectively to the each switching elements 71a to 71f via the driving control mechanism of the hammer drill 100. Therefore the rotor 23 of the motor 20 is rotated by following driving controls (1) to (6) step by step. (1) By providing driving signals to a first switching element 71a and a sixth switching element 71f, an electric current is applied from a first stator coil 22U to a third stator coil 22W. (2) By providing driving signals to a third switching element 71c and the sixth switching element 71f, the electric current is applied from a second stator coil 22V to the third stator coil 22W. (3) By providing driving signals to the third switching element 71c and a second switching element 71b, the electric current is applied from the second stator coil 22V to the first stator coil 22U. (4) By providing driving signals to the second switching element 71b and a fifth switching element 71e, the electric current is applied from the third stator coil 22W to the first stator coil 22U. (5) By providing driving signals to a forth switching element 71d and the fifth switching element 71e, the electric is applied from the third stator coil 22W to the second stator coil 22V. (6) By providing driving signals to the first switching element 71a and the forth switching element 71d, the electric current is applied from the first stator coil 22U to the second stator coil 22V.

When the motor 20 is driving, not only the controller 60 and the driving current providing device 70 but also the motor 20 itself generate heat. Therefore a cooling fan 90 is attached on the rotational shaft 21 of the motor 20 to radiate heat generated by the motor 20, the controller 60 and the driving current providing device 70. The cooling fan 90 is attached so as to generate a cooling air which flows from the lower part of the hammer drill 100 to the upper part of the hammer drill 100. The cooling air generated from the cooling fan 90 is a feature corresponding to "a cooling air" of the invention.

As shown in FIG. 2, an air inlet 11 and an air outlet 12 are disposed on the housing 10. The air inlet 11 includes openings 11a which are formed at 6 parts respectively on a pair of housings which compose the housing 10. The openings 11a are arranged at a position on the housing 10, the position is located between the motor 20 and the controller 60 as well as the driving current providing device 70 in the side view. Therefore a radiation surface (upper surface) of the radiation plate 72 is adapted and arranged so as to extend along a flow of the cooling air flowed from the air inlet 11. In other words, the radiation plate 72 is arranged so that a normal direction of the radiation surface of the radiation plate 72 crosses a normal direction of a surface of an area where the openings 11a is formed of the housing 10. The air outlet 12 includes a plurality of openings 12a disposed on the housing 10 and is arranged at an area being upper than the motor 20 in the side view of the hammer drill 100.

According to the hammer drill 100 described above, when a user operates the trigger 121, the controller 60 provides the driving signal to the driving current providing device 70 thereby the switching element 71 of the driving current providing device 70 is controlled. As a result, the driving current providing device 70 provides current to the motor 20 from the battery 130 thereby the motor 20 is driven. The rotational motion of the motor 20 is converted to a linear motion in the front-rear direction and then the linear motion is transmitted to the piston 35. As the piston 35 slides in the cylinder 36, the striker 51 is slid via an air in the air room 53 as an air spring. And then the striker 51 hits the impact bolt 52 thereby the impact power is transmitted to the hammer bit 200. In this way, the hammer bit 200 generates a hammering power in the front-rear direction of the hammer drill 100. The hammering operation to the workpiece is performed by the hammering power. On the other hand, the rotational motion of the motor 20 is decelerated and by the power transmission mechanism and then transmitted to the hammer bit 200 thereby a rotational power of the hammer bit 200 is generated. The drill operation to the workpiece is performed by the rotational power. Namely in a state that the hammer bit is pressed on the workpiece, the hammer drill 100 performs the hammering operation and the drill operation to the workpiece. In addition, regardless of above, the hammer drill 100 may perform only one operation among the hammering operation and the drill operation.

During the operation, as the rotational shaft 21 rotates, the cooling fan 90 attached on the rotational shaft is rotated thereby an air flow is generated inside the housing 10. Namely, an outside air of the hammer drill 100 is flowed into the housing 10 through the openings 11a of the air inlet 10 by the air flow generated by the rotation of the cooling fan 90. The air flowed into the housing 10 flows along the radiation surface of the radiation plate 72 and flows through the motor 20 and the cooling fan 90 and finally the air is exhausted to the outside of the hammer drill 100 through the openings 12a of the air outlet 12.

According to this embodiment described above, because the controller 60, the driving current providing device 70 and the motor 20 are arranged adjacently to each other, the heat generated by the controller 60, the driving current providing device 70 and the motor 20 is effectively dissipated by the cooling air flowed by the rotation of the cooling fan 90. Further, the cooling fan 90 is attached on the rotational shaft 21 of the motor 20, and the controller 60 and the driving current providing device 70 are arranged so as to be overlapped with the motor 20 when seen in the axis line of the rotational shaft 21, therefore the controller 60 and the driving current providing device 70 are arranged in a route of the cooling air. In this way, the heat generated by the controller 60 and the driving current providing device 70 is more effectively dissipated. Further, the controller 60 and the driving current providing device 70 are arranged at an upstream area than the motor 20 with respect to the flow of the cooling air, therefore the heat generated by the controller 60 and the driving current providing device 70 is dissipated by relatively fresh air flowed from the openings 11a of the air inlet 11. Namely, the heat generated the controller 60 and the driving current providing device 70 which generate relatively much heat, is effectively dissipated.

Further according to this embodiment, the radiation surface of the radiation plate 72 is arranged to extend along the flow of the cooling air flowed into the housing 10, therefore the cooling air flows smoothly along the radiation surface without being stagnated. Accordingly, the heat transmitted to the radiation plate 72 from the driving current providing device 70 and saved in the radiation plate 72 is effectively dissipated. Namely the driving current providing device 70 is effectively cooled. Further, the controller 60 and the driving current providing device 70 are arranged on the axis line of the rotational shaft 21 to be aligned to each other, therefore both of the controller 60 and the driving current providing device 70 are uniformly cooled with respect to the circumference direction of the rotational shaft 21.

Further according to this embodiment, the partial part A of the grip 120 is arranged at the rear side of the hammer drill 100 and on the longitudinal line of the hammer bit 200, therefore the power to which a user applies on the partial part A of the grip 120 during the operation is regulated to be converted into the moment. As a result the power applied by a user is effectively transmitted to the hammer bit 200. Further, the trigger 121 is arranged at the partial part A on the grip 120, therefore during the operation the trigger 121 is pulled easily by a user when the user holds the partial part A of the grip 120.

Further according to this embodiment, the battery 130 is arranged at a lower part of the grip 120 and is arranged at a rear part of the body 110 which houses the motor 20, therefore components of the hammer drill 100 are arranged rationally. As a result, the hammer drill 100 is downsized.

In this embodiment the cooling fan 90 is attached on the rotational shaft 21 of the motor 20, however the cooling fan 90 may be attached on another shaft other than the rotational shaft 21. Further according to the invention, the cooling fan 90 is not limited to be rotated by the motor 20. Namely another motor other than the motor 20 may be arranged and the cooling fan 90 may be adapted to be rotated by said another motor.

Further in this embodiment, the motion converting mechanism 30 is arranged at the upper area of the rotational shaft 21 of the motor 20, the power transmission mechanism 40 is arranged at front side of the motion converting mechanism 30, and the impact element 50 is arranged at the upper area of the motion converting mechanism 30. However the position of the motion converting mechanism 30, the power transmission mechanism 40 and the impact element 50 is not limited to what described above. The motion converting mechanism 30 may be arranged as long as at an upper area of the motor 20 for converting the rotation of the motor 20. Further the power transmission mechanism 40 and the impact element 50 may be arranged as long as at a position to be able to transmit the rotation of the motor 20 to the tool holder 150 and/or the hammer bit 200.

Further in this embodiment, the controller 60 and the driving current providing device 70 are arranged to be overlapped with the motor 20 when seen in the axis line of the rotational shaft 21 of the motor and to be adjacent to each other. However the position of the controller 60 and the driving current providing device 70 is not limited to what described above. For example, only the radiation plate 72 may be arranged to be overlapped with the motor 20 when seen in the axis line of the rotational shaft 21, and the switching element 71 may be arranged not to be overlapped with the motor 20. Further one component among the controller 60 and the driving current providing device 70 may be arranged to be overlapped with the motor 20 when seen in the axis line of the rotational shaft 21.

Further in this embodiment, only the driving current providing device 70 has the radiation plate 72, however both of the driving current providing device 70 and the controller 60 may have a radiation plate respectively. In this case, the radiation plate corresponding to the controller 60 and the radiation plate corresponding to the driving current providing device 70 may be formed integrally so that one piece of a radiation plate is arranged to contact with the CPU, the ROM and the RAM of the controller 60 and the switching element 71 of the driving current providing device 70.

Further in this embodiment, the radiation plate 72 is defined as a plane member, however a shape of the radiation member is not limited to the plane member. Namely the radiation member may be defined as a finned member which has a plurality of fins protruding vertically from a plate, each of fins extends to be parallel to each other. A side surface of the fin is a feature corresponding to "a heat radiating surface" of the invention. The direction to which the fin protrudes from the plate may be coincided with the vertical direction of the hammer drill 100 of the front-rear direction of the hammer drill 100. In this case, the radiating surface (the side surface) of the fin may be arranged to extend along a direction of the flow of the cooling air, which corresponds to the lateral direction of the hammer drill 100. As the finned member as a radiation member may be arranged, the heat transmitted to the finned member is effectively dissipated by the cooling air. As a result, the driving current providing device 70 may be effectively cooled. In this case, only the fin of the radiation member may be arranged to overlapped with the motor 20 when seen in the axis line of the rotational shaft 21. Further, the controller 60 may also have the finned member. Further, at least one finned member among the controller 60 and the driving current providing device 70 may be arranged to be overlapped with the motor 20. Further, the finned member of the controller 60 and the finned member of the driving current providing device 70 may be formed integrally.

Further in this embodiment, both of the controller 60 and the driving current providing device 70 are arranged to be overlapped with the motor 20 when seen in the axis line of the rotational shaft 21, however at least one component among the controller 60 and the driving current providing device 70 may be arranged to be overlapped with the motor 20.

Further in this embodiment, the controller 60 and the driving current providing device 70 are arranged at the upstream area than the motor 20 with respect to the flow of the cooling air, however the controller 60 and the driving current providing device 70 may be arranged at a downstream area than the motor 20 with respect to the flow of the cooling air.

Further in this embodiment, the air inlet 11 is arranged between the motor 20 and the controller 60 as well as the driving current providing device 70 in side view, however the position of the air inlet 11 is not limited described above. For example, the air inlet may be arranged at a lower area of the controller 60 and the driving current providing device 70 in side view.

Further in this embodiment, the motor 20 is arranged so that the rotational shaft 21 of the motor 20 crosses the longitudinal direction of the hammer bit 200, however the motor 20 may be arranged so that the rotational shaft 21 is parallel to the longitudinal direction of the hammer bit 200. Further the axial direction of the rotational shaft 21 of the motor 20 and as well as the direction in which the grip 120 extends correspond with the vertical direction of the hammer drill 100, however the axial direction of the rotational shaft 21 and the direction in which the grip 120 extends are not limited being parallel to each other.

Having regard to an aspect of the invention, following features are provided:

(Feature 1)

An impact tool which actuates a tool reciprocally in a longitudinal direction of the tool to perform a hammering operation to a workpiece, comprising:

a brushless DC motor which includes a rotational shaft, the brushless DC motor actuating the tool by means of a rotation of the rotational shaft;

a battery for actuating the brushless DC motor;

a current providing device which provides current from the battery to the brushless DC motor;

a controller which controls the current providing device; and a cooling fan which is driven by the rotation of the rotational shaft, wherein the brushless DC motor, the controller and the current providing device are arranged adjacently to each other, and are cooled by a cooling air generated by the cooling fan.

(Feature 2)

The impact tool according to Feature 1, wherein the current providing device and the controller are arranged at an upper stream region than the brushless DC motor with respect to a flow of the cooling air.

(Feature 3)

The impact tool according to Feature 2, further comprising a housing which houses the brushless DC motor, the current providing device and the controller and includes an air inlet wherein the air inlet is arranged between the brushless DC motor and the current providing device as well as the controller.

(Feature 4)

The impact tool according to Feature 3, wherein said at least one component has a radiation member, wherein the radiation member includes a heat radiating surface having a predetermined area, and wherein the radiation member is arranged such that the heat radiating surface extends along the flow of the cooling air.

(Feature 5)

The impact tool according to Feature 4, wherein the radiation member is arranged to contact with both of the current providing device and the controller.

(Feature 6)

The impact tool according to Feature 4 or 5, wherein the radiation member is formed as a plate member, and wherein the radiation member is arranged such that a normal direction of a surface of the radiation member crosses a normal direction of a part on which the air inlet is formed of the housing.

(Feature 7)

The impact tool according to Feature 4 or 5, wherein the radiation member is provided with a plate and a fin protruding from the plate, and wherein the radiation member is arranged such that a direction in which the fin extends is parallel to a normal direction of a part on which the air inlet is formed of the housing.

DESCRIPTION OF NUMERALS 10 housing
11 air inlet
11a opening
12 air outlet
12a opening
20 motor
21 rotational shaft
22 stator
23 rotor
30 motion converting mechanism
31 bevel gear
32 intermediate shaft
33 rotational member
34 swing member
35 piston
36 cylinder
40 power transmission mechanism
41 first gear
42 second gear
50 impact element
51 striker
52 impact bolt
53 air room
60 controller
70 driving current providing device
71 switching element
72 radiation plate
80 container
90 cooling fan
100 hammer drill
110 body
120 grip
121 trigger
130 battery
140 handle
141 attachment ring
150 tool holder
200 hammer bit

What is claimed is:

1. An impact tool which actuates a tool reciprocally in a longitudinal direction of the tool and is configured to perform a hammering operation to a workpiece, comprising:
    a brushless DC motor which includes a rotational shaft, the brushless DC motor actuating the tool by means of a rotation of the rotational shaft;
    a battery for actuating the brushless DC motor;
    a current providing device which provides current from the battery to the brushless DC motor, the current providing device including a plurality of switching devices;
    a controller which controls the plurality of switching devices of the current providing device;

a cooling fan which is driven by the rotation of the rotational shaft, and a housing which houses the brushless DC motor, the current providing device and the controller, and includes an air inlet that includes a plurality of openings and an air outlet, wherein the controller and the current providing device are disposed inside a container, which is disposed inside the housing, and the container and the brushless DC motor are arranged adjacently to each other such that the brushless DC motor is disposed above the container in a direction perpendicular to longitudinal direction of the tool, the air inlet is arranged only at a part of the housing which is located between the brushless DC motor and the container in the direction perpendicular to the longitudinal direction of the tool, the current providing device and the controller are arranged at an upper stream of the brushless DC motor with respect to a flow of the cooling air, and the air outlet is provided at a downstream of the brushless DC motor with respect to the flow of the cooling air.

2. The impact tool according to claim 1, wherein the cooling fan is attached to the rotational shaft, and wherein at least one component among the current providing device and the controller is arranged to be overlapped with the brushless DC motor when seen in an axial direction of the rotational shaft.

3. The impact tool according to claim 2, wherein the current providing device and the controller are both arranged on an axis line of the rotational shaft.

4. The impact tool according to claim 1, wherein at least one of the current providing device and the controller has a radiation member, wherein the radiation member includes a heat radiating surface having a predetermined area, and wherein the radiation member is arranged such that the heat radiating surface extends along the flow of the cooling air.

5. The impact tool according to claim 4, wherein the radiation member is arranged to contact with both of the current providing device and the controller.

6. The impact tool according to claim 4, wherein the radiation member is formed as a plate member, and wherein the radiation member is arranged such that a normal direction of a surface of the radiation member crosses a normal direction of a part on which the air inlet is formed of the housing.

7. The impact tool according to claim 4, wherein the radiation member is provided with a plate and a fin protruding from the plate, and wherein the radiation member is arranged such that a direction in which the fin extends is transverse to a normal direction of a part on which the air inlet is formed of the housing.

8. The impact tool according to claim 1, wherein the rotational shaft is adapted and arranged to cross the longitudinal direction of the tool.

9. The impact tool according to claim 8, further comprising a driving mechanism which actuates the tool by transmitting the rotation of the rotational shaft of the brushless DC motor to the tool, wherein the driving mechanism is arranged at one side of the rotational shaft, and wherein the current providing device and the controller are arranged at the other side of the rotational shaft.

10. The impact tool according to claim 1, further comprising a grip which is adapted to be gripped by a user, wherein a predetermined part of the grip is arranged on a longitudinal line of the tool.

11. The impact tool according to claim 10, wherein the grip is provided to extend in a direction crossing the longitudinal direction of the tool, and wherein the battery is provided to connect to one end of the grip.

12. The impact tool according to claim 1, wherein the air outlet is arranged at an adjacent area of the cooling fan.

* * * * *